Patented Apr. 2, 1935

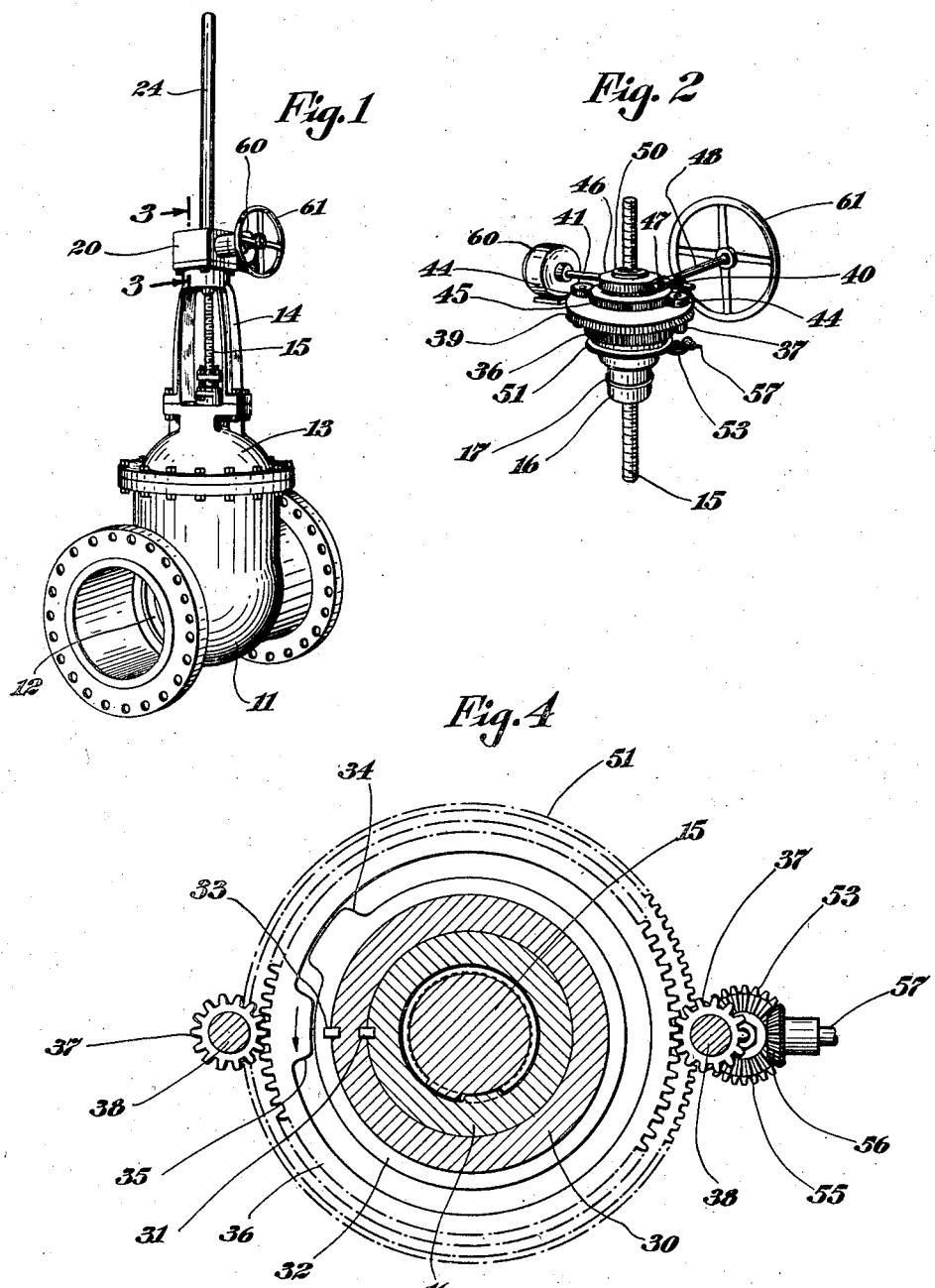

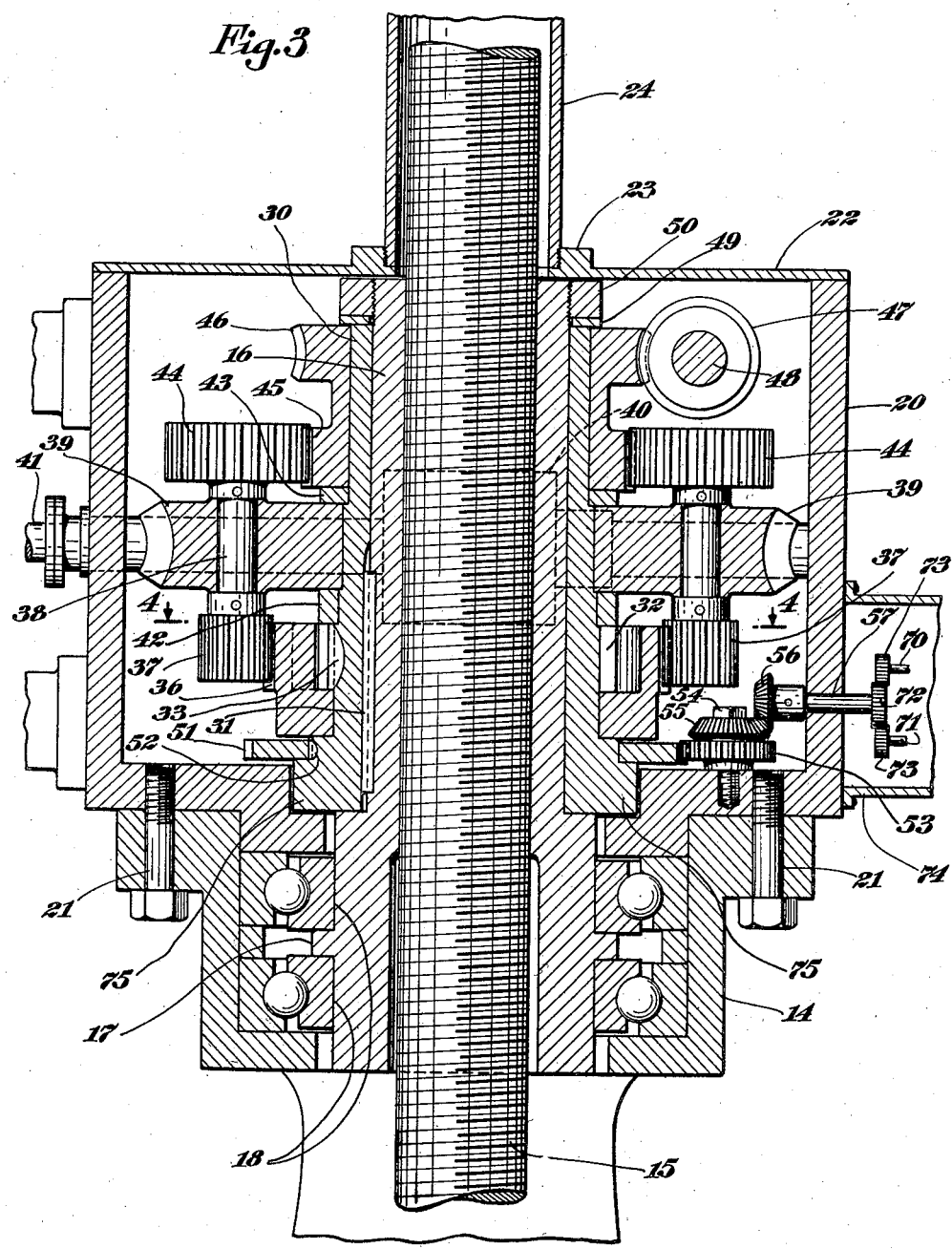

1,996,365

UNITED STATES PATENT OFFICE 1,996,365

DRIVING DEVICE FOR VALVES AND THE LIKE

Wendel W. Clinedinst, Pawling, N. Y.

Application June 24, 1933, Serial No. 677,386

6 Claims. (Cl. 74—282)

My present invention relates generally to motive apparatus, and has particular reference to a new and improved type of device for actuating a valve or the like.

Although my invention is primarily designed for the actuation of large gate valves, nevertheless it will be understood that a number of phases of my invention are not restricted to a specific use of this character; and that, broadly speaking, various features of my invention relate to the actuation of any rotatable member and not necessarily a valve stem nut or the like.

The type of valve for which my invention is primarily designed, and which I have illustrated in the accompanying drawings by way of example, is of the large gate type which is customarily provided with an upwardly extending, threaded stem, the up-and-down movement of which actuates the gate of the valve. Because the opening and closing of large valves of this type is laborious and time-consuming, it is customary and desirable to provide such valves with a mechanism or device for actuating them by power, as, for example, by means of an electric motor. A motor drive is also desirable for the purpose of permitting remote control. At the same time, it is usually necessary that an auxiliary means be provided, other than the power source, to permit actuation of the valve, manually, in cases of emergency and under various other conditions.

Before describing the features of my present invention, I will preface by stating that the usual provision for manual actuation involves an auxiliary spindle projecting from the mechanism and carrying a large-diameter hand-wheel or the like. In one well known type of valve-driving mechanism, this hand-wheel rotates rapidly whenever the motor drive is used; and as a preventive measure against the obvious hazard that is thus presented, it is often customary to dismount the hand-wheel entirely from the spindle when it is not actually in use. This is not only an annoying procedure, but is obviously inefficient and time-consuming, not to mention the fact that the exposed rotating spindle end is itself a dangerous thing. In other types of mechanism, the hand-wheel spindle is adapted to be declutched, but an arrangement of this kind is also unsatisfactory since the clutch may usually be engaged only when the valve is at rest, and it presents an added source of possible annoyance, deterioration, and repair.

It is one of the main objects of the present invention to provide a device for actuating a valve of the foregoing general character, whereby both manual and power actuation are available, without requiring the employment of clutches or the like, and permitting either driving device to be employed at will, either singly or in conjunction with the other. It is a particular feature of my invention to provide an apparatus whereby neither actuating device produces any reversal of operation of the other. In this way, either the power source or the manual hand-wheel may be safely operated at any time, independently of the other.

Stated otherwise, my present device may be said to constrain the driving effect of either the motor or the hand-wheel to the actuation of the valve.

More particularly, my present invention provides for two constantly connected driving spindles, both of which are constantly in driving relation to the rotatable member which is to be actuated, such as the valve stem nut. Without requiring any mutual disconnection of the driving spindles, either or both of them may be employed at any time to actuate the rotatable member.

A further feature of my invention lies in the provision of an arrangement which permits a suitable starting impulse or "hammer blow" to overcome any resistance to initial movement which the rotatable member may present.

A further feature of my invention lies in providing a device of the foregoing general character in association with a device (well known per se) for limiting the movement or travel of the valve stem or similar member which is being actuated.

One of the main features of my invention lies in an arrangement which is of a unitary and compact character, adapted to be shipped, stored, installed, or removed, as a unit, from any valve or similar device which is designed to be actuated thereby. More particularly, the device is of such a character that it may be removed either in whole or in part at any time for purposes of inspection or repair, without in the least impairing the setting of any travel-limiting device, and without requiring any costly dismantling of the valve structure itself.

In general, it is an object of my invention to provide an actuating device which is inexpensive to manufacture, simple to install, easily removable either in whole or in part for purposes of repair or inspection, reliable and efficient in operation, compact and staunch, entirely safe, and permitting selective operation at all times of either a manual or a motive drive.

I achieve the foregoing objects, and such other objects as may hereinafter appear or be pointed out, in the manner illustratively exemplified in the accompanying drawings, wherein—

Figure 1 is a perspective view of a completely assembled, outside-screw valve with an actuating device of the present character mounted thereon;

Figure 2 is a fragmentary, perspective view of certain portions of the present mechanism;

Figure 3 is an enlarged, vertical cross-section through a device of the present character; and Figure 4 is a cross-sectional view taken substantially along the line 4—4 of Figure 3.

Referring to the drawings, I have shown in Figure 1 a typical valve body 11 in which 12 is the usual gate and 13 is the valve bonnet provided with the yoke 14. The gate is provided with the upwardly extending and externally threaded stem 15 which passes upwardly through the top of the yoke 14 and enters into engagement with the interiorly threaded stem nut 16. Upon viewing Figure 3, it will be observed that the stem nut 16 is preferably provided with a rib 17 arranged between a double set of thrust bearings 18. The weight of the suspended or raised gate is thus transmitted through the stem to the nut, and through the lower thrust bearing 18 to the valve yoke, bonnet, and body.

The elements thus far described are usually obtainable from valve manufacturers as standard products, and the practical employment of my present invention contemplates that these parts will all be included in the purchase of an assembled valve or the like.

In accordance with my invention, the present driving mechanism is conveniently and compactly arranged within a housing 20 adapted to be applied to, and removed from, the yoke 14, as a unit. I have illustratively shown the manner in which the housing 20 may be rested upon the upper end of the yoke 14 and held in position by means of the studs or machine screws 21. The housing 20 is preferably provided with a cover 22 having a central boss 23 threaded to accommodate the usual stem-protecting casing or tube 24.

In a preferred embodiment of my invention, I provide an assembly sleeve 30 in driving relationship to the stem nut 16. With this objective in view, I have shown the sleeve 30 provided with a key and keyway 31, whereby the sleeve may be applied to and withdrawn axially from the stem nut 16.

Mounted upon the assembly sleeve 30 are two worm wheels 39 and 46. A driving worm 40 engages with the worm wheel 39 and is mounted upon a shaft 41 which extends from one driving source, for example, the electric motor 60.

The other worm wheel 46 is driven by a worm 47 which meshes therewith, this worm being mounted upon a shaft 48 driven by the second source of power, for example, the hand wheel 61.

Before describing the details of my construction and assembly of parts, I will state briefly that it is the purpose of my invention to provide means whereby either the motor 60 or the hand wheel 61 may be operated to cause rotation of the stem nut 16, through the intermediary of the assembly sleeve 30 which is keyed thereto; and to constrain the driving effect in each case to the stem nut, so that the motor 60 and the hand wheel 61 may be used alternatively, or simultaneously, at all times, without any interference of one with the other, and without any necessity for disconnecting or declutching any of the parts.

I achieve the objective referred to by mounting upon the sleeve 30 a pair of sun gears 36 and 45, and causing these gears to cooperate by a planetary arrangement carried by the worm wheel 39.

The sun gear 36 is mounted in driving relation to the sleeve 30, and hence to the nut 16; while the sun gear 45 is mounted for free rotation around the sleeve 30. It is also to be noted that the worm wheel 46 is carried by the sun gear 45 and may, in fact, be integrally formed therewith; while the worm wheel 39 is mounted independently of either of the sun gears and is freely rotatable around the sleeve 30.

The driving relation between the sun gear 36 and the sleeve 30 is preferably established by interposing a lost motion collar 32 between this gear and the sleeve 30. This collar is keyed to the sleeve 30, as at 33, and is provided with an exterior projection 34 which is interposed in the path of movement of a corresponding interior projection 35 carried by the gear 36. When the gear 36 is rotated in either direction, the projection 35 ultimately encounters the projection 34 and causes a corresponding rotation of the collar 32, this rotation being then transmitted to the sleeve 30 and to the nut 16.

The reason for preferably employing a lost motion collar of the foregoing character is that the sudden impact between the projections 34 and 35 imparts an enhanced starting impulse to the rotation of the stem nut 16. If these projections happen to be in contact at the outset, the gear 36 is preferably rotated initially in the wrong direction through a substantial arc, so that when its contemplated rotation is then effected the desired impact will result.

The worm wheel 39 is preferably spaced from the sun gears by the collars or spacers 42 and 43. It carries one or more axially arranged spindles 38 to which are secured planet gears or pinions 37 and 44, these pinions engaging, respectively, as planets, with the sun gears 36 and 45.

To explain the operation of the mechanism, let it be assumed first that the driving power is applied by the driving motor 60. Rotation of the worm 40 causes rotation of the worm wheel 39. Since the worm 47 locks the worm wheel 46 against rotation, the sun gear 45 is similarly in a relatively stationary position with respect to the rotating worm wheel 39, as a result of which the spindles 38 are caused to rotate around their own axes. The planetary pinion 37 thus assumes the role of a driving pinion and causes a corresponding rotation of the driving sun gear 36. The rotation of the latter is transmitted, in the manner hereinbefore described, to the stem nut 16.

It is to be noted that during the driving procedure above outlined, the hand wheel 61 is entirely stationary, and that the driving effect of the motor 60 is constrained to be effective only upon the stem nut 16. Any declutching or disconnection of the hand wheel 61 is thus entirely unnecessary.

Let it now be assumed that the motor 60 is inoperative (as it might be, for example, if no current were available or if the motor were out of order), and let it be further assumed that the rotation of the stem nut 16 is to be effected by driving the hand wheel 61. The rotation of the worm 47 then causes rotation of the worm wheel 46, thus causing a corresponding rotation of the sun gear 45. Since the worm 40 locks the worm wheel 39 against rotation, the engagement of the sun gear 45 with the pinions 44 is ineffective to rotate the worm wheel 39, and causes merely a rotation of the spindles 38 around their own axes. This results, as hereinbefore explained, in causing the planetary pinions 37 to rotate as driving pinions, and rotation is thus imparted to the driving sun gear 36 and through it to the stem nut 16.

It is again to be noted that the driving effect of the hand wheel 61 is constrained to the stem nut 16, and that the shaft 41 is entirely unaffected and need not be declutched or disconnected from the apparatus.

From the foregoing description, it will be obvious, also, that the motor 60 and the hand wheel 61 may be operated simultaneously, without any interference of one with the other. If, for example, the motor 60 is driving, and a workman accidentally or intentionally rotates the hand wheel 61, he is in no danger whatsoever of being injured by any sudden transmission of driving force backwards through the shaft 48 to the handle 61. The only effect which the rotation of the hand wheel 61 can have is to speed up the rotation of the stem nut and thereby "assist" the motor, or to slow up the rotation of the stem nut, the particular effect, in any case, depending upon the direction in which the hand wheel 61 is rotated. Of course, by rotating the hand wheel 61 with sufficient speed in the proper direction, the effect of the motor 60 can be entirely nullified, but this is an utterly improbable contingency.

By the same token, if a workman happens to be operating the hand wheel 61, and if the motor 60 should be suddenly started (as, for example, if current supply is again resumed; or if by accident someone turns on the switch), no possible harm can come to the workman, since the effect of the motor is constrained solely to the rotation of the stem nut and does not in the least affect the rotation, by the workman, of the hand wheel 61. The only possible effect of this type of contingency is that the motor will either drive the stem nut faster (thereby accomplishing what the workman is attempting to do by hand), or the motor will drive the stem nut in the opposite direction from the one which is contemplated. The particular effect that will result in any given case depends, of course, upon the relative directions of rotation of the motor and the hand wheel.

A particular feature of my invention lies in the convenient manner in which a travel-limiting device, or "limit switch", may be operated. A device of this character is usually associated with a driving mechanism of the present type for the purpose of automatically rendering the driving motor inoperative when the gate reaches one or the other end of its contemplated travel. While I have not illustrated the details of a travel-limiting device of this character, I will state briefly that it consists usually of an arrangement of electric circuits and relays which function automatically to discontinue the power supply which is driving the motor when the gate reaches one or the other end of its travel.

A device of this character is, of course, adjusted or "set" during the initial installation of the driving mechanism. This setting should not be disturbed thereafter, although with the ordinary types of driving mechanisms it is usually necessary to disturb this setting whenever the mechanism is disassembled, either wholly or in part, for purposes of inspection or repair. With my present invention, the "limit" switch" setting need never be disturbed, and the several parts of the present construction may be removed either wholly or individually without in the least affecting the travel-limiting device.

This desirable result is achieved by mounting a gear 51 at the lower end of the assembly sleeve 30, this gear being keyed to the sleeve, as at 52, and being adapted to drive the travel-limiting device through the intermediary of the gear 53, the beveled gears 55, 56, and the driving shaft 57. I have illustratively shown the gear 53 and the associated gears and driving shaft in journaled relation to the housing 20; and I have also shown, by way of example, the way the shaft 57 may drive two subsidiary shafts 70 and 71 through the intermediary of gears 72 and 73. It will be understood that the shafts 70 and 71 are merely portions of a typical "limit switch" mechanism which may be conveniently housed in an auxiliary housing 74 attached to the main housing 20. Usually, the shaft 70 drives mechanism which controls one relay, while the shaft 71 drives similar mechanism which controls a second relay. While the gate is rising or falling, these relays are operative to permit the supply of current to the driving motor to continue; but when the gate reaches either one or the other end of its contemplated movement, one or the other relay operates automatically to disconnect the motor from the current supply.

It is to be observed that the lower end of the sleeve 30 is provided with the enlarged flange 75, and that the sleeve is preferably stepped from its bottom to its top, for the purpose of supporting the several gears and worm wheels hereinbefore described. At the upper end of the sleeve a washer 49 and an assembly nut 50 are associated with the sleeve, thereby holding all of the gears in unitary relationship. As a result of this construction, it is a relatively simple matter, in case repair or inspection is necessary, to remove the cover 22 from the housing 20, and thereupon to lift the entire assembly sleeve 30, and all of its associated parts, bodily out of the housing 20. In doing this, the setting of the "limit switch" is entirely undisturbed, since the gear 51 may be lifted upwardly or downwardly with respect to the gear 53, without in the least disturbing the positional relationship of the gear 53.

While the exact relationship between the various gears has not been described in detail, the proportions illustrated in the drawings are substantially correct. It will be understood, of course, that if both sets of sun and planet gears were of the same ratio, no driving effect could be accomplished, and that, as a matter of fact, the gears are proportioned and arranged so that there is a sufficient conventional relationship between the two sets of sun and planet gears to effect the desired purpose.

It will also be understood that the worms and worm wheels employed are of such pitch that they are not reversible, i. e., neither worm wheel can drive its corresponding worm.

Having thus described my invention, and illustrated its use, what I claim as new and desire to secure by Letters Patent is:—

1. In combination with a valve having a threaded stem and a stem nut, a valve-actuating device comprising a removable and replaceable assembly sleeve secured coaxially to said nut, a pair of sun gears on said sleeve one of which is mounted in driving relation to said sleeve and the other of which is freely rotatable around said sleeve, a pair of worm wheels on said sleeve one of which is carried by the free gear and the other of which is freely rotatable around said sleeve independently of said gears, a spindle journaled in the independent worm wheel, a pair of pinions secured to said spindle and engaging said sun gears, respectively, as planets, and a pair of worms engaging said worm wheels, respectively, whereby either worm may be driven to rotate the stem nut, the driving effect being transmitted only to said nut.

2. In combination with a valve having a threaded stem and a stem nut, a valve-actuating device comprising a removable and replaceable assembly sleeve secured coaxially to said nut, a sun gear mounted on said sleeve in driving relation to said sleeve, a second sun gear mounted on said sleeve for free rotation relative to the sleeve, a worm wheel coaxially carried by said free gear, a second worm wheel between said sun gears and mounted on said sleeve for free rotation relative to the sleeve, a spindle journaled in the free worm wheel, a pair of pinions secured to said spindle on opposite sides of the worm wheel and externally engaging said sun gears, respectively, as planets, and a pair of worms engaging said worm wheels, respectively, whereby the driving effects of said worms, operating either singly or together, will be transmitted only to said nut.

3. In combination with a valve having a threaded stem and a stem nut, a valve-actuating device comprising a removable and replaceable assembly sleeve secured coaxially to said nut, a lost-motion collar secured to said sleeve, a pair of sun gears on said sleeve, one sun gear being mounted in driving relation to said collar, the other sun gear being freely rotatable relative to the sleeve, a pair of worm wheels on said sleeve, one worm wheel being carried by the freely rotatable sun gear, the other worm wheel being positioned between the sun gears and freely rotatable relative to the sleeve, a spindle journaled in the last-named worm wheel, a pair of pinions secured to the spindle and engaging said sun gears, respectively, as planets, and a pair of worms engaging said worm wheels, respectively, whereby either worm may be driven to rotate the stem nut through the intermediary of said collar and sleeve, and whereby the driving effects of said worms, operating either singly or together, will be transmitted only to said nut.

4. In a device for driving a rotatable member, a sleeve removably keyed to said member, a driving gear connected to said sleeve, a planetary pinion engaging said driving gear, a spindle keyed to said pinion, a worm wheel carrying said spindle, a worm permanently engaging said worm wheel, a second planetary pinion keyed to said spindle, a sun gear engaging said second pinion, a second worm wheel fixed concentrically to said sun gear, a second worm permanently engaging the last-named worm wheel, whereby driving power may be applied to said member by rotating either of said worms, and means at opposite ends of the sleeve for holding the sun gear, the driving gear, and the worm wheels in unitary assembly carried by the sleeve.

5. In a device of the type described, the combination of a threaded stem, a nut on the stem, an elongated sleeve secured on the nut for rotating the same, a drive for the sleeve, gearing carried by the sleeve for rotating the same including interlocking gears driven from said drive, and means for locking the sleeve on the nut against axial movement and being releasable to permit removal of the sleeve with its gearing as a unit independently of said drive.

6. In a device of the type described, the combination of a threaded stem, a nut on the stem, an elongated sleeve secured on the nut for rotating the same, two independent drives for said sleeve, planetary gearing wholly carried by said sleeve and interconnecting said drives, and means for locking the sleeve on the nut against axial movement and being releasable to permit removal of the sleeve with its gearing as a unit.

WENDEL W. CLINEDINST.